United States Patent
Patton, Jr.

(10) Patent No.: US 8,140,605 B2
(45) Date of Patent: Mar. 20, 2012

(54) ELECTRONIC DATE CALCULATOR

(76) Inventor: Roy Chilson Patton, Jr., Morganton, NC (US)

( * ) Notice: Subject to any disclaimer, the term of this patent is extended or adjusted under 35 U.S.C. 154(b) by 1098 days.

(21) Appl. No.: 11/941,720

(22) Filed: Nov. 16, 2007

(65) Prior Publication Data

US 2008/0301208 A1  Dec. 4, 2008

Related U.S. Application Data

(60) Provisional application No. 60/940,512, filed on May 29, 2007.

(51) Int. Cl.
*G06F 15/02* (2006.01)
(52) U.S. Cl. ...................................................... 708/112
(58) Field of Classification Search ......................... None
See application file for complete search history.

(56) References Cited

U.S. PATENT DOCUMENTS

| | | | | |
|---|---|---|---|---|
| 4,055,749 A * | 10/1977 | Kraushaar | ..................... | 377/52 |
| 4,162,610 A | 7/1979 | Levine | | |
| 4,274,146 A * | 6/1981 | Yanagawa | ..................... | 708/112 |
| 4,276,606 A | 6/1981 | Harigaya et al. | | |
| 4,367,527 A | 1/1983 | Desjacques | | |
| 5,197,042 A | 3/1993 | Brookner et al. | | |
| 5,289,393 A * | 2/1994 | Kaya | ..................... | 708/112 |
| 5,387,164 A * | 2/1995 | Brown, Jr. | ..................... | 482/9 |
| 5,619,477 A | 4/1997 | Schenk | | |
| 5,763,860 A | 6/1998 | Denis et al. | | |
| 5,777,905 A | 7/1998 | Dowdle et al. | | |
| 5,886,331 A | 3/1999 | Lyons, Jr. | | |
| 6,108,640 A | 8/2000 | Slotznick | | |
| 6,693,627 B1 | 2/2004 | Lee et al. | | |
| 6,854,819 B2 | 2/2005 | Lenthall et al. | | |
| 7,376,909 B1 * | 5/2008 | Coyle | ..................... | 715/778 |
| 2006/0069600 A1 * | 3/2006 | Massang | ..................... | 705/8 |

FOREIGN PATENT DOCUMENTS

| | | |
|---|---|---|
| KR | 1019900007122 | 9/1990 |
| KR | 1020050032815 | 4/2005 |

* cited by examiner

*Primary Examiner* — David H Malzahn
(74) *Attorney, Agent, or Firm* — Trego, Hines & Ladenheim, PLLC

(57) ABSTRACT

An electronic date calculator includes an electronic processor, input keys operably connected to the processor, at least one date function key corresponding with a selected date unit and operably connected to the processor, and a display operably connected to the processor. The processor is programmed to drive the display to show a present date. In response solely to entry of a multiplier from the input keys and a date unit from the date function key, the processor adds a product of the selected date unit and the multiplier to the present date to generate a resulting date, and drives the first display to show the resulting date.

20 Claims, 7 Drawing Sheets

ELECTRONIC DATE CALCULATOR

CROSS-REFERENCE TO RELATED APPLICATIONS

This application claims the benefit of Provisional Application No. 60/940,512 Filed May 29, 2007.

BACKGROUND OF THE INVENTION

This invention relates generally to electronic calendars and more particularly to an electronic calendar with date calculation functions.

Various types of electronic calendars and timepieces are known which can track and display the present date. Calculators and computers are also available which can display the present date, and can perform calculations using dates.

In various situations it is desirable to know the exact value of a date which is a certain interval in the future or the past, i.e. a certain number of days, weeks, or months ahead of or prior to the present time. For example, it may be desired to schedule a business meeting, medical appointment, bill payment, business action item, or the like to occur 30 days, two weeks, or six months from the present day. Normally, determination of the future date would involve laborious manual counting of days and/or reference to several pages of a calendar. It is possible using known computer techniques to make such calculations using a conventional handheld calculator or microcomputer. However, these calculations typically require several keystrokes to select the date calculation function and enter the proper arguments, or in the case of a computer, a spreadsheet formula entry or quasi-programming entry is required. These functions are thus slow and inconvenient.

BRIEF SUMMARY OF THE INVENTION

These and other shortcomings of the prior art are addressed by the present invention, which provides a date calculator that provides convenient calculation and display of future and past dates.

According to one aspect of the invention, a date calculator includes: an electronic processor; input keys operably connected to the processor; at least one date function key corresponding with a selected date unit and operably connected to the processor; and a first display operably connected to the processor. The processor is programmed to: (a) drive the first display to show a present date, and in response solely to entry of a multiplier from the input keys and a date unit from the date function key: (b) multiply the selected date unit by the multiplier, and add the product thereof to the present date to generate a resulting date; and (c) drive the first display to show the resulting date.

According to another aspect of the invention, a method of calculating a date includes: using an electronic processor, determining a present date and showing the present date on a display; inputting a multiplier to the processor; using a single date function key operably connected to the processor, inputting a date unit to the processor; in response to the input of the date unit, using the processor to add the product of the multiplier and the interval to the present date, so as to obtain a resulting date; and showing the resulting date on the display.

According to another aspect of the invention, a computer program product includes a computer-readable medium containing instructions causing a computer to carry out a method of calculating a date. The method includes: determining a present date and showing the present date on a display operably connected to the computer; receiving an input of a multiplier; showing on the display at least one date function key, the date function key bearing indicia representing a preselected date unit; in response to the input of the date unit by the at least one date function key, adding the product of the multiplier and the interval to the present date, so as to obtain a resulting date; and showing the resulting date on the display.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
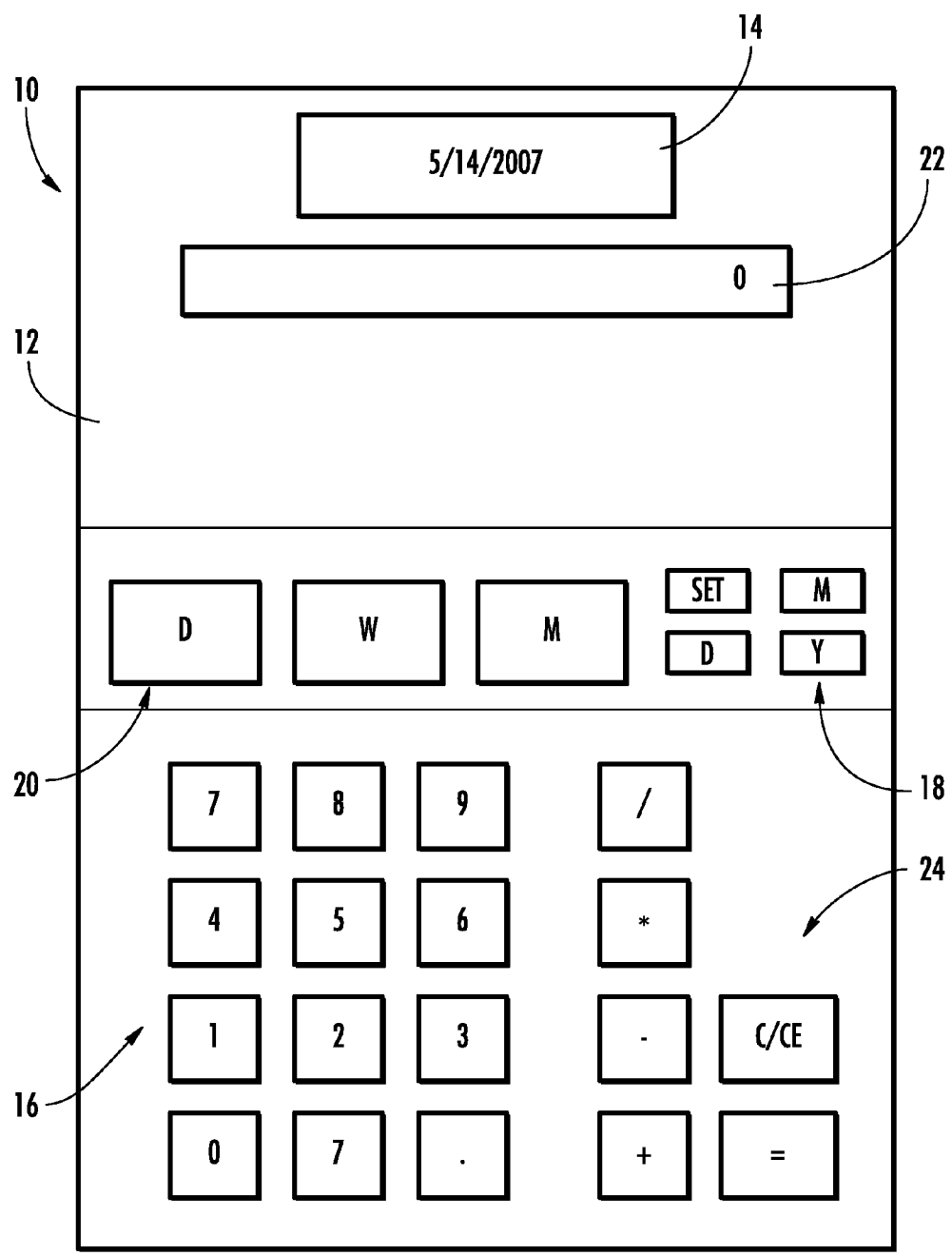
FIG. 1 is a front view of a date calculator constructed according to an aspect of the present invention.

Referring to the drawings wherein identical reference numerals denote the same elements throughout the various views, FIG. 1 depicts an exemplary date calculator 10 constructed according to an aspect of the present invention. It is similar in construction to a prior art hand calculator and includes a housing 12, a date display 14, numeric keys 16, date setting keys 18, and date function keys 20. In the illustrated example there are three date function keys 20 which are labeled "D" for days, "W" for weeks, and "M" for months, respectively.

As shown here, the date calculator 10 also incorporates the functions of a conventional mathematical calculator and includes a numeric display 22 and mathematical function keys 24 used to enter arguments and commands and to display results of mathematical operations. The principle of the present invention may be incorporated in any type of electronic device that has a date display including, for example, watches or alarm clocks, hand or desk calculators, stand-alone calendar units, desk planners, or the like.

Figure 2:
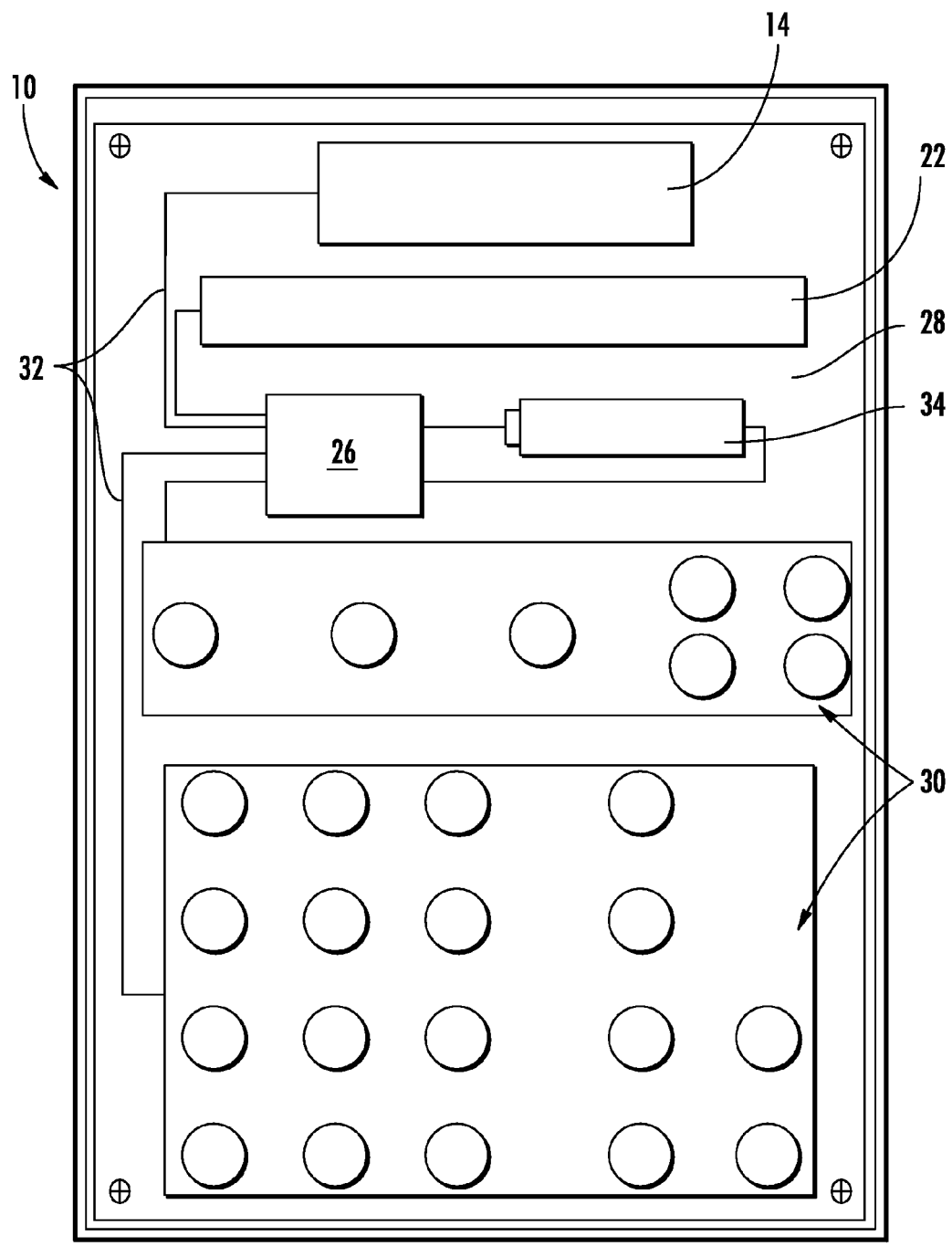
FIG. 2 is a schematic view of the internal arrangement of the date calculator of FIG. 1.

FIG. 2 shows one possible internal arrangement of the date calculator 10. A microprocessor 26 of a known type is mounted to a circuit board 28 along with the displays 14 and 22 (For example LCDs) and switch banks 30 which underlie the keys. The components are operably connected to each other, for example by conductive traces 32 on the circuit board 28. The microprocessor 26 includes a quartz clock, real-time clock (RTC) chip or other suitable time reference. The date calculator 10 is provided with a power source such as the illustrated battery 34, line current, photovoltaic cells, or combinations thereof. Other known types of processors, circuits, or computers capable of executing date calculations may be substituted for these components. The microprocessor 26 or other calculating device may execute stored software instructions to perform the operations described below, or those functions may be incorporated as a part of its permanent circuit configuration (i.e. it may be a single-purpose device).

Figure 3:
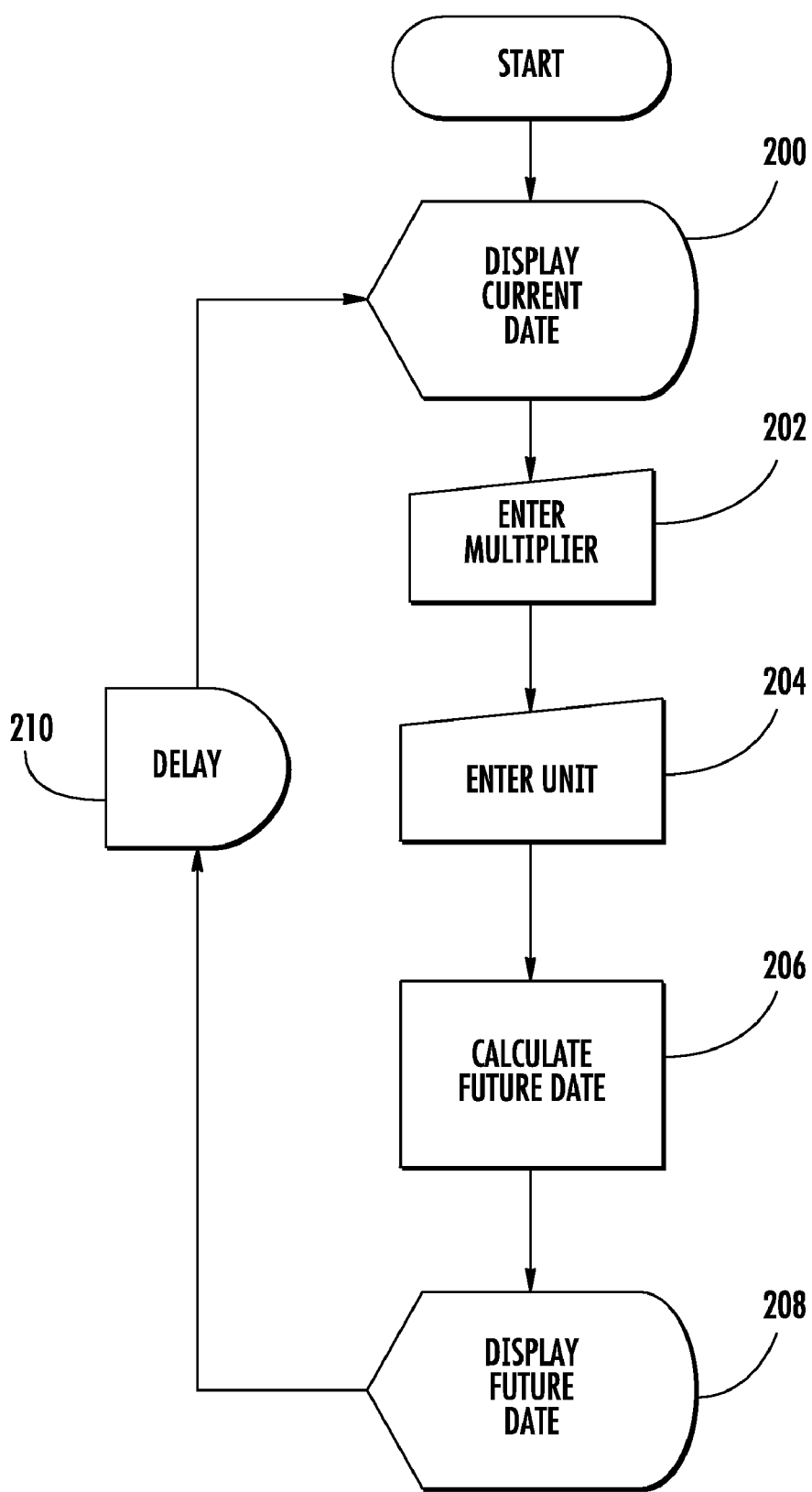
FIG. 3 is block diagram illustrating the method of operation of the date calculator.
Figure 4:
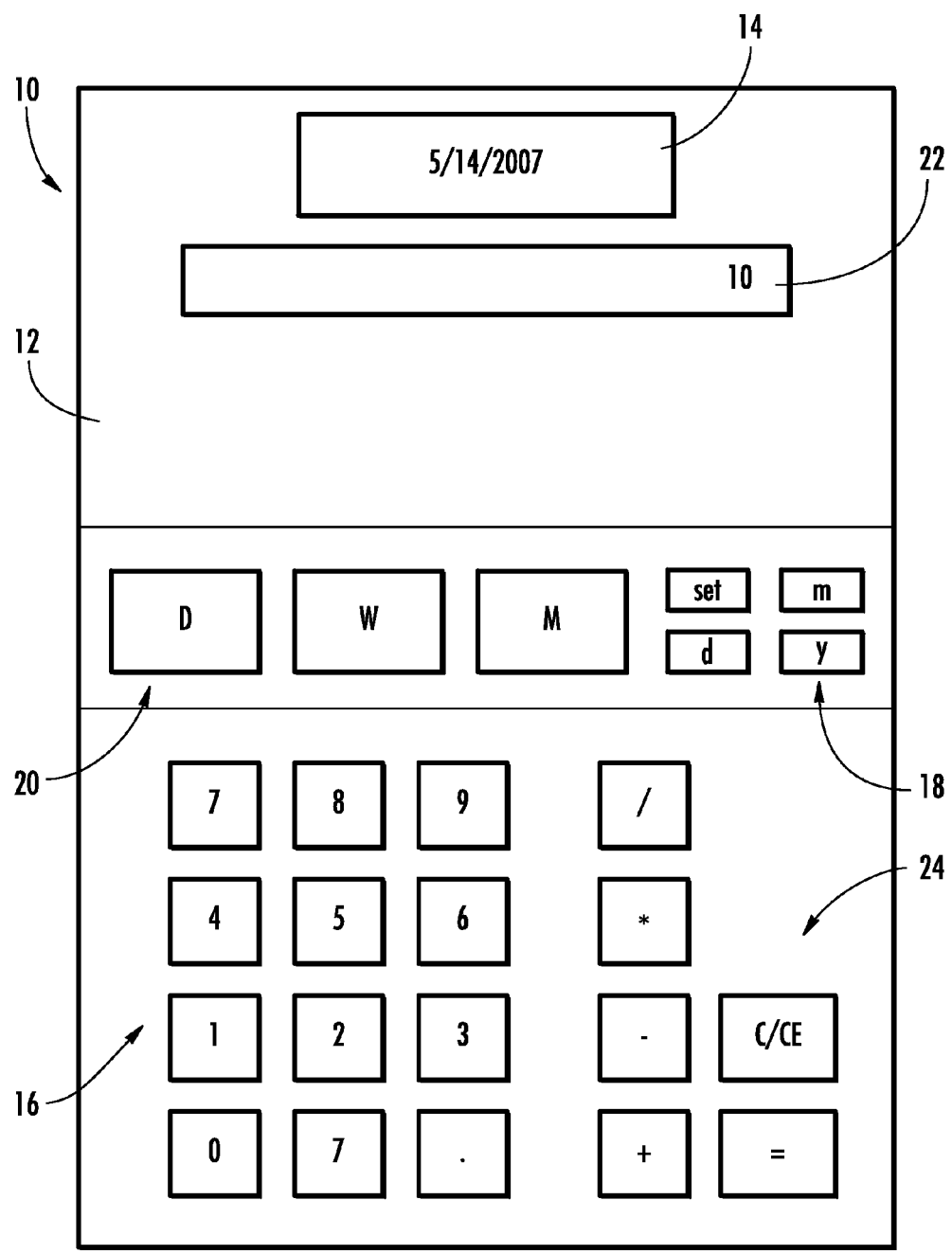
FIG. 4 is a front view of the date calculator of FIG. 1 after a first user input.

The operation of the date calculator 10 is now described with reference to FIG. 3. When initially started, the date setting keys 18 or other suitable means are used to set the present date in the same manner as a prior art electronic calendar. Thereafter, in a nominal state, the date display 14, driven by the microprocessor 26, will show the present date (block 200). In FIG. 1, the example date shown is May 14, 2007 on the Gregorian calendar with a month/day/year format. When the user desires to calculate a future date, he first enters a multiplier using the numeric keys 16 at block 202. In the example shown in FIG. 4, the user has entered the sequence 1, 0. The result "10" shows on the numeric display 22. It is noted that, if a simpler interface is desired, other kinds of input keys could be substituted for the numeric keys 16. For example, simple keys (not shown) which increment a digit in the numeric display 22 each time they are pushed, and then cycle back to zero after reaching an upper limit, could be used. Then, at block 204, the user presses the date function key 20 with the selected unit. In this case, the user has pressed the key labeled "D" for days. Once the date function key 20 is pressed, a date calculation routine is immediately called at block 206 with the selected multiplier and the unit as arguments.

Figure 5:
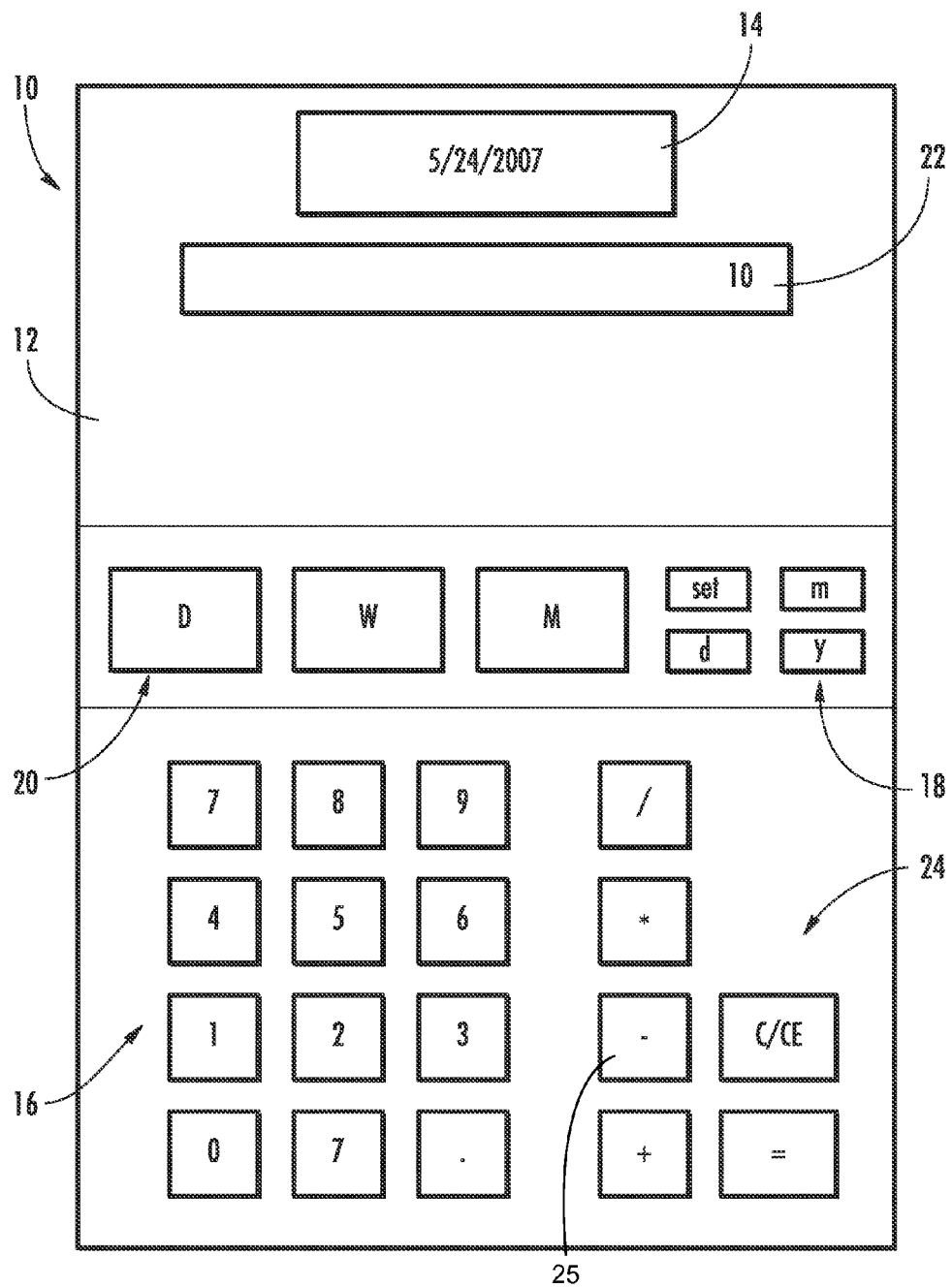
FIG. 5 is a front view of the date calculator of FIG. 1 with a future date displayed.

The microprocessor 26 adds an interval, which is defined as the number of units equal to the multiplier (i.e. the product of the unit and the multiplier), to the present date. In this case the calculated interval would be 10 days. The resulting sum is converted to the resulting or future date. As shown in FIG. 5, the future date would be May 24, 2007 on the Gregorian calendar, or May 24, 2007 in the illustrated format. This date is shown on the date display 14 at block 208. After a suitable selected delay at block 210, for example about 30 seconds, the date display 14 reverts to the present date. Alternatively, the future date may be displayed until a specified key or key sequence is entered.

It is also possible to use the date calculator 10 to calculate a date in the past. For example, the minus or "negative" key 25 provided as part of the mathematical function keys 24 may be pressed before or after the entry of the multiplier as described above. The subsequent processing would then proceed as outlined above, except that the interval added to the present date would be a negative interval (this could also be conceptualized as subtracting an interval from the present date), and the resulting date displayed would be the selected number of days, weeks, months, etc. in the past.

Various methods may be used to perform the actual date calculation. In most cases, the present date will be stored in the microprocessor 26 as an integer (i.e. a serial date). This value is converted to an easily human-readable format (i.e. Gregorian calendar) for display in accordance with known methods. The addition of the date interval to the present date the present date is also carried out using known programming and/or software methods, for example a "dateadd" programming function.

Figure 6:
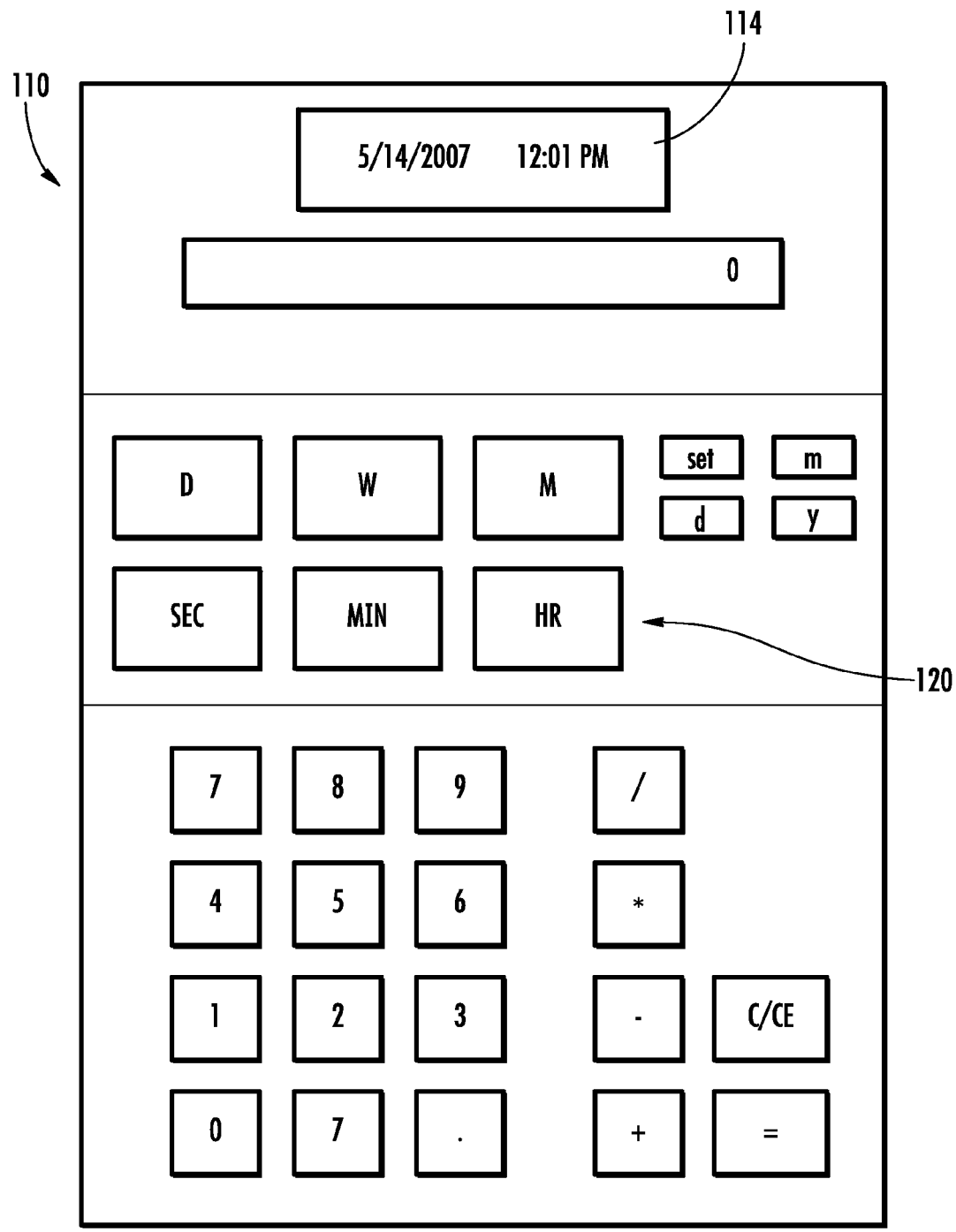
FIG. 6 is a front view of an alternative date calculator.

In addition to the functions described above, the date calculator 10 may be extended to add other intervals to the present time by providing additional date function keys 20. For example, keys for years or decades might be added if desired. Furthermore, the time of day may be part of the calculation as well as the date. For example, FIG. 6 illustrates an alternative date calculator 110 which also displays the time in its date display 114. The date function keys 120 include additional units such as seconds, minutes, and hours. In a process similar to that described above, a selected amount of time may be added to the present date and time and the date calculator 110 would display the future date and time. For example, if 24 hours were added to the date and time of May 14, 2007 12:01 PM, the resulting future date and time displayed would be May 15, 2007 at 12:01 PM.

Figure 7:
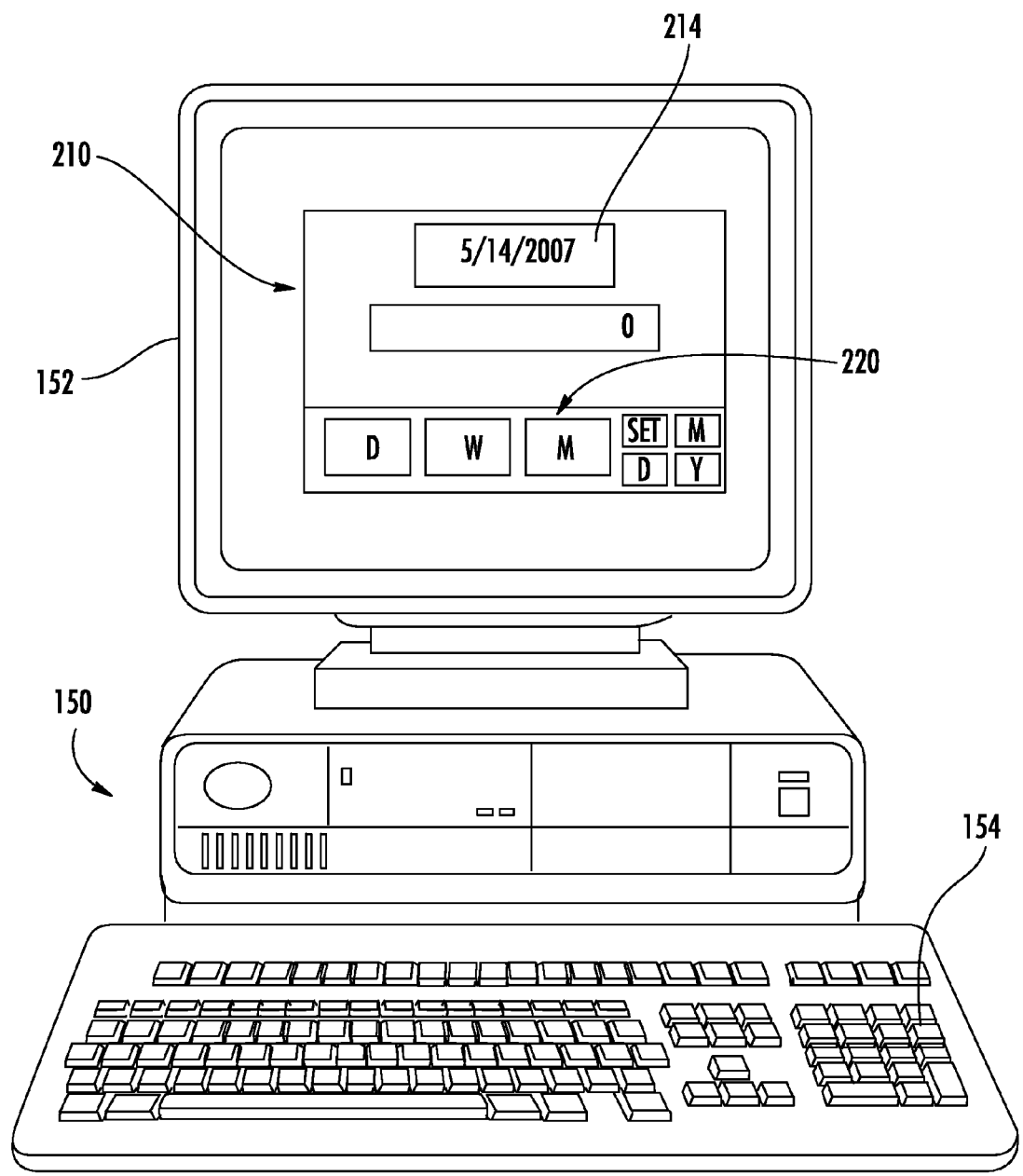
FIG. 7 is a schematic view of a date calculator as implemented on a general-purpose computer.

While the above description has described a hardware device, it will be understood that the present invention may also be implemented as software. For example, FIG. 7 illustrates a general-purpose computer 150 of a known type, such as a PC-compatible or MACINTOSH computer, with a monitor 152. The computer 150 is programmed with software code which causes it to display an image of a date calculator 210. The image 210 has an interface similar to the date calculator 10 described above and includes, at a minimum, a date display 214, and graphical user-operable software "buttons" representing date function keys 220. In the illustrated example there are three date function keys 220 which are labeled "D" for days, "W" for weeks, and "M" for months, respectively. A numeric keypad 154 of the computer 150 may be used for number entry in place of the numeric keys described above. If desired, the image 210 may be designed to imitate the physical appearance of a hand-held calculator.

The operation of the software to calculate a resulting date based on a unit and multiplier is substantially identical to the operation of the date calculator 10 described above, with the key difference being that the user interacts with the graphical buttons of the image 210 using a pointing device in a known manner, rather than physical hardware. Touch-screen buttons could also be used. Optionally, the image 210 may be accessed by a software "shortcut" or icon, and the software may be programmed to remove the image from the screen automatically after a preselected time. Furthermore, the software may include a user-selectable parameter for setting any desired date as the present date or "base date" for calculations.

The foregoing has described a date calculator. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only.

What is claimed is:

1. A date calculator, comprising:
   an electronic processor;
   input keys operably connected to the processor;
   at least one date function key corresponding with a selected date unit and operably connected to the processor; and
   a first display operably connected to the processor;
   wherein the processor is programmed to:
   (a) drive the first display to show a present date;
   (b) in response solely to entry, during display of the present date, of a multiplier from the input keys and a selected date unit from the date function key, multiply the selected date unit by the multiplier, and add the product thereof to the present date to generate a resulting date; and
   (c) drive the first display to show the resulting date.

2. The date calculator of claim 1 wherein the date function key bears an indicia corresponding to the selected date unit.

3. The date calculator of claim 1 further including a plurality of date function keys each corresponding to a different date unit.

4. The date calculator of claim 3 wherein the date function keys are included corresponding to days, weeks, and months.

5. The date calculator of claim 1 wherein the processor is programmed to, after driving the first display to show the resulting date for a selected time interval, driving the first display to show the present date.

6. The date calculator of claim 1 further including mathematical function keys operably connected to the processor, wherein the processor is programmed to, in response to input from the mathematical function keys, perform at least one mathematical operation and drive the first display to show the result of the operation.

7. The date calculator of claim 6 further including a second display operably connected to the processor for displaying the result of the mathematical operations.

8. The date calculator of claim 1 wherein the present date and the resulting date are formatted in accordance with the Gregorian calendar.

9. The date calculator of claim 1 wherein the processor is programmed to drive the first display to show a current time in addition to the present date.

10. The date calculator of claim 1 further including an additional key operably connected to the processor for inputting a negative interval.

11. A method of calculating a date, comprising:
using an electronic processor, determining a present date and showing the present date on a display;
inputting a multiplier to the processor;
using a single key operably connected to the processor, inputting a date unit to the processor;
in response to the input of the date unit, using the processor to add the product of the multiplier and the date unit to the present date, so as to obtain a resulting date; and
showing the resulting date on the display.

12. The method of claim 11 further comprising, after showing the resulting date for a selected time interval, showing the present date on the display.

13. The method of claim 11 further comprising displaying the present date formatted in accordance with the Gregorian calendar.

14. The method of claim 11 further comprising displaying the resulting date formatted in accordance with the Gregorian calendar.

15. The method of claim 11 wherein the resulting date is a date in the future relative to the present date.

16. The method of claim 11 wherein the resulting date is a date in the past relative to the present date.

17. A computer program product comprising a computer-readable medium containing instructions causing a computer to carry out a method of calculating a date, the method comprising:
determining a present date and showing the present date on a display operably connected to the computer;
receiving an input of a multiplier;
showing on the display at least one date function key, the date function key bearing indicia representing a preselected date unit;
in response to the input of the date unit by the at least one date function key, adding the product of the multiplier and the date unit to the present date, so as to obtain a resulting date; and
showing the resulting date on the display.

18. The computer program product of claim 17 wherein the method further comprises, after showing the resulting date for a selected time interval, showing the present date on the display.

19. The computer program product of claim 17 wherein the resulting date is a date in the future relative to the present date.

20. The computer program product of claim 17 wherein the resulting date is a date in the past relative to the present date.

* * * * *